United States Patent
Anichkov

(10) Patent No.: US 11,757,286 B2
(45) Date of Patent: Sep. 12, 2023

(54) METHOD AND SYSTEM FOR PROVIDING RENEWABLE ENERGY PLANT FREQUENCY RESPONSE

(71) Applicant: MERIT SI, LLC, Annandale, NJ (US)

(72) Inventor: Dmitriy Anichkov, Somerville, NJ (US)

(73) Assignee: MERIT SI, LLC, Annandale, NJ (US)

( * ) Notice: Subject to any disclaimer, the term of this patent is extended or adjusted under 35 U.S.C. 154(b) by 597 days.

(21) Appl. No.: 17/040,566

(22) PCT Filed: Apr. 22, 2019

(86) PCT No.: PCT/US2019/028489
§ 371 (c)(1),
(2) Date: Sep. 23, 2020

(87) PCT Pub. No.: WO2019/209701
PCT Pub. Date: Oct. 31, 2019

(65) Prior Publication Data
US 2021/0066925 A1 Mar. 4, 2021

Related U.S. Application Data

(60) Provisional application No. 62/662,307, filed on Apr. 25, 2018.

(51) Int. Cl.
*H02J 3/38* (2006.01)
*H02J 3/06* (2006.01)
(Continued)

(52) U.S. Cl.
CPC .............. *H02J 3/381* (2013.01); *F03D 9/255* (2017.02); *H02J 2300/20* (2020.01)

(58) Field of Classification Search
CPC ........ H02J 3/381; H02J 2300/20; H02J 3/241; H02J 3/46; H02J 3/48; F03D 9/255;
(Continued)

(56) References Cited

U.S. PATENT DOCUMENTS 10,700,541 B2 * 6/2020 ElBsat ................... H02J 3/381
11,262,718 B2 * 3/2022 Anichkov .............. G06Q 40/04
(Continued)

OTHER PUBLICATIONS

International Search Report dated Jul. 25, 2019 in corresponding PCT International Application No. PCT/US2019/028489.
(Continued)

*Primary Examiner* — Ramesh B Patel
(74) *Attorney, Agent, or Firm* — OSTROLENK FABER LLP

(57) ABSTRACT

A method for providing frequency response for a plant coupled to an electric power grid, the plant having an intermittent energy source, comprising: measuring frequency of the power output from the plant and determining a first difference between the measured frequency and a frequency reference; measuring power output from the plant and storing the measured power output as a stored value; while the first difference is within a deadband, determining a second difference as a difference between a power reference and the measured power output; while the first difference indicates over-frequency, determining the second difference as a difference between the stored value and the measured power output; while the first difference indicates under-frequency, setting the second difference equal to the power reference; generating an error by limiting a sum of the first and second differences between error limits; generating a control signal; and, applying the control signal to the source.

17 Claims, 7 Drawing Sheets

(51) Int. Cl.
*H02J 3/16* (2006.01)
*F03D 9/25* (2016.01)

(58) Field of Classification Search
CPC ..... Y02E 10/72; Y02E 10/76; H02P 2101/15; H02P 13/06; H02P 9/48
See application file for complete search history.

(56) References Cited

U.S. PATENT DOCUMENTS

| | | | |
|---|---|---|---|
| 11,451,062 B2* | 9/2022 | Anichkov | H02J 3/06 |
| 2010/0066086 A1* | 3/2010 | Ko | F03D 7/0284 |
| | | | 290/44 |
| 2011/0001318 A1* | 1/2011 | Nelson | H02J 3/48 |
| | | | 290/44 |
| 2014/0070617 A1* | 3/2014 | Detmers | H02J 7/04 |
| | | | 307/64 |
| 2014/0152009 A1* | 6/2014 | Meisner | H02P 9/00 |
| | | | 290/7 |
| 2015/0137519 A1 | 5/2015 | Tarnowski | |
| 2016/0329713 A1* | 11/2016 | Berard | H02M 5/04 |
| 2017/0104336 A1* | 4/2017 | ElBsat | H02J 7/0068 |
| 2017/0104342 A1* | 4/2017 | ElBsat | H02J 3/38 |
| 2022/0283558 A1* | 9/2022 | Anichkov | H02J 3/241 |

OTHER PUBLICATIONS

Written Opinion dated Jul. 25, 2019 in corresponding PCT International Application No. PCT/US2019/028489.

United States of America Federal Energy Regulatory Commission, 18 CFR Part 3500; Order No. 842; Essential Reliability Services and the Evolving Bulk-Power System—Primary Frequency Response, issued Feb. 15, 2018; URL address: https://www.ferc.gov/whats-new/comm-meet/2018/021518/E-2.pdf; download date: Apr. 13, 2018.

WECC Solar Plant Dynamic Modeling Guidelines, adopted/approved by TSS on May 8, 2014, URL address: https://www.wecc.biz/Reliability/WECC%20Solar%20Plant%20Dynamic%20Modeling%20Guidelines.pdf; download date: Apr. 11, 2018.

* cited by examiner

700

```
┌─ Start ─┐ — 701
└─────────┘
     │
     ▼
```

702 — With Respect to Providing Frequency Response for a Renewable Energy Plant coupled to an Electric Power Grid, the Renewable Energy Plant having an Intermittent Energy Source, First, Using a Renewable Energy Plant Control System, Measuring Frequency of the Power Output from the Renewable Energy Plant and Determining a First Difference Signal between the Measured Frequency and a Frequency Reference

703 — Measuring Power Output from the Renewable Energy Plant and Storing the Measured Power Output as a Stored Measured Power Output Value

704 — While the First Difference Signal is within a Predetermined Frequency Deviation Deadband, Determining a Second Difference Signal as a Difference between a Power Reference and the Measured Power Output

705 — While the First Difference Signal Indicates an Over-Frequency Condition, Determining the Second Difference Signal as a Difference between the Stored Measured Power Output Value and the Measured Power Output

706 — While the First Difference Signal Indicates an Under-Frequency Condition, Setting the Second Difference Signal Equal to the Power Reference

707 — Generating an Error Signal by Limiting a Sum of the First and Second Difference Signals between Predetermined Minimum and Maximum Power Error Limits

708 — Generating a Control Signal by Applying the Error Signal to a Controller

709 — Applying the Control Signal to the Intermittent Energy Source to Control the Power Output Therefrom

710 — End

FIG. 7

METHOD AND SYSTEM FOR PROVIDING RENEWABLE ENERGY PLANT FREQUENCY RESPONSE

CROSS-REFERENCE TO RELATED APPLICATIONS

The present application is a 35 U.S.C. §§ 371 national phase conversion of PCT/US2019/028489, filed Apr. 22, 2019, which claims priority to U.S. Provisional Patent Application No. 62/662,307, filed Apr. 25, 2018, the contents of all of which are incorporated herein by reference.

FIELD OF THE INVENTION

This invention relates to the field of control systems, and more specifically, to a method and system for providing renewable energy plant frequency response.

BACKGROUND OF THE INVENTION

The ability of a power system to maintain its electrical frequency within a safe range is crucial for stability and reliability. Frequency response is a measure of an interconnection's ability to stabilize the frequency immediately following the sudden loss of generation or load. The United States Federal Energy Regulatory Commission ("FERC") recently revisited primary frequency response regulations in Order No. 842 (See "UNITED STATES OF AMERICA FEDERAL ENERGY REGULATORY COMMISSION 18 CFR Part 3500; Order No. 842; Essential Reliability Services and the Evolving Bulk-Power System—Primary Frequency Response"; issued Feb. 15, 2018; https://www.ferc.gov/whats-new/comm-meet/2018/021518/E-2.pdf; accessed Apr. 13, 2018; and, incorporated herein by reference). Reliable power system operation depends on system frequency. Frequency deviation from nominal is caused by power imbalance due to abrupt momentous changes in load or generation. Significant frequency excursion can trip generation units and loads. Inertial response, primary frequency response, and secondary frequency response mitigate frequency deviation. Primary frequency response, collectively provided by system generators, is intended to arrest frequency deviation keeping it within an acceptable range.

In the above mentioned Order, the FERC states that customers "shall ensure that the Large Generating Facility's real power response to sustained frequency deviations outside of the deadband setting is automatically provided and shall begin immediately after frequency deviates outside of the deadband, and to the extent the Large Generating Facility has operating capability in the direction needed to correct the frequency deviation." In addition, the FERC notes that the "Large Generating Facility shall sustain the real power response at least until system frequency returns to a value within the deadband setting of the governor or equivalent controls."

Renewable energy plants typically include solar photovoltaic ("PV") and wind intermittent energy sources. Both PV and wind systems are rapidly growing in quantity and size making their frequency response even more important. FIG. 1 is a block diagram illustrating a control system for a renewable energy plant in accordance with the prior art. (See "WECC Solar Plant Dynamic Modeling Guidelines"; https://www.wecc.biz/Reliability/WECC%20Solar%20Plant%20Dynamic%20Modeling%20Guidelines.pdf; accessed Apr. 11, 2018; and incorporated herein by reference.) Such control systems typically include the following. First, closed loop voltage regulation at a user-designated bus. The voltage feedback signal has provisions for line drop compensation, voltage droop response, and a user-settable deadband on the voltage error signal. Second, closed loop reactive power regulation on a user-designated branch with a user-settable deadband on the reactive power error signal. Third, a plant-level governor response signal derived from frequency deviation at a user designated bus. The frequency droop response is applied to active power flow on a user-designated branch. Frequency droop control is capable of being activated in both over and under frequency conditions. The frequency deviation applied to the droop gain is typically subject to a user-settable deadband.

One problem with such existing control systems is that the real power response does not always begin immediately after the frequency deviates outside of the deadband when the plant has operating capability in the direction needed to correct the frequency deviation.

FIG. 2 is a chart illustrating operations of the control system of FIG. 1 in accordance with the prior art. FIG. 2 illustrates performance of the above-mentioned control during cloud passage over the solar plant. The x-axis is relative test time and the Y-axis is power per unit (p.u.). Line 3010 represents a power reference, which limits plant generation. Line 3030 represents measured plant power generation. Line 3020 represents measured system frequency. Point 3021 on the system frequency line 3020 shows the beginning of an over-frequency deviation outside of the deadband. Required real power response does not occur because power generation is below the power reference 3010. However, the plant power is positive and therefore the plant has operating capability in the direction needed to correct the frequency deviation.

Another problem with such existing control systems is that the plant does not always sustain the real power response until the system frequency returns to a value within the deadband setting of the governor. The automatic generation control ("AGC") command communicated to the renewable energy plant control system can override the power reference during frequency excursion, effecting plant frequency response.

A need therefore exists for an improved method and system for providing renewable energy plant frequency response. Accordingly, a solution that addresses, at least in part, the above and other shortcomings is desired.

SUMMARY OF THE INVENTION

According to one aspect of the invention, there is provided a method for providing frequency response for a renewable energy plant coupled to an electric power grid, the renewable energy plant having an intermittent energy source, the method comprising: using a renewable energy plant control system, measuring frequency of the power output from the renewable energy plant and determining a first difference signal between the measured frequency and a frequency reference; measuring power output from the renewable energy plant and storing the measured power output as a stored measured power output value; while the first difference signal is within a predetermined frequency deviation deadband, determining a second difference signal as a difference between a power reference and the measured power output; while the first difference signal indicates an over-frequency condition, determining the second difference signal as a difference between the stored measured power output value and the measured power output; while the first difference signal indicates an under-frequency condition, setting the second difference signal equal to the power reference; generating an error signal by limiting a sum of the first and second difference signals between predetermined minimum and maximum power error limits; generating a control signal by applying the error signal to a controller; and, applying the control signal to the intermittent energy source to control the power output therefrom.

In accordance with further aspects of the invention, there is provided an apparatus such as an information system, a control system, a computer system, etc., a method for adapting these, as well as articles of manufacture such as a computer readable medium or product and computer program product or software product (e.g., comprising a non-transitory medium) having program instructions recorded thereon for practicing the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE EXAMPLE EMBODIMENTS

In the following description, details are set forth to provide an understanding of the invention. In some instances, certain software, circuits, structures and methods have not been described or shown in detail in order not to obscure the invention. The term "information system" or "system" is used herein to refer to any machine for processing data, including the control systems, controllers, energy management systems, supervisory control and data acquisition ("SCADA") systems, computer systems, and network arrangements described herein. The present invention may be implemented in any computer programming language provided that the operating system of the data processing system provides the facilities that may support the requirements of the present application. Any limitations presented would be a result of a particular type of operating system or computer programming language and would not be a limitation of the present invention. The present invention may also be implemented in hardware or in a combination of hardware and software.

According to one embodiment of the invention, there is provided an improved method and system for providing frequency response for a renewable energy plant coupled to an electric power grid, the renewable energy plant having an intermittent energy source. According to another embodiment, there is provided a method for controlling energy sources for a renewable energy plant, wherein the plant is connected to a power grid and the plant has an intermittent energy source whose output is dependent on environmental variables.

Figure 1:
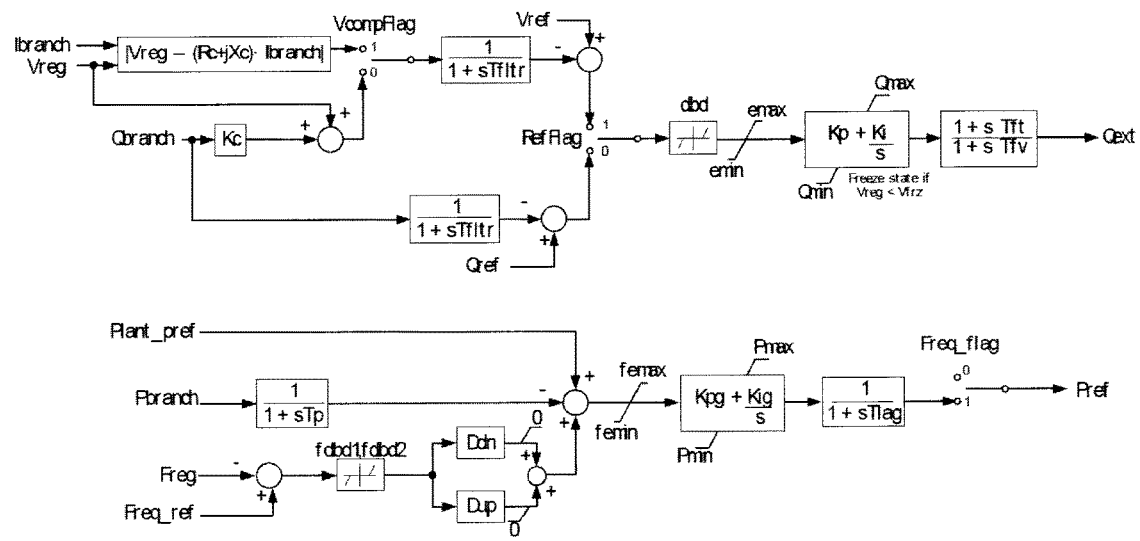
FIG. 1 is a block diagram illustrating a control system for a renewable energy plant in accordance with the prior art.
Figure 2:
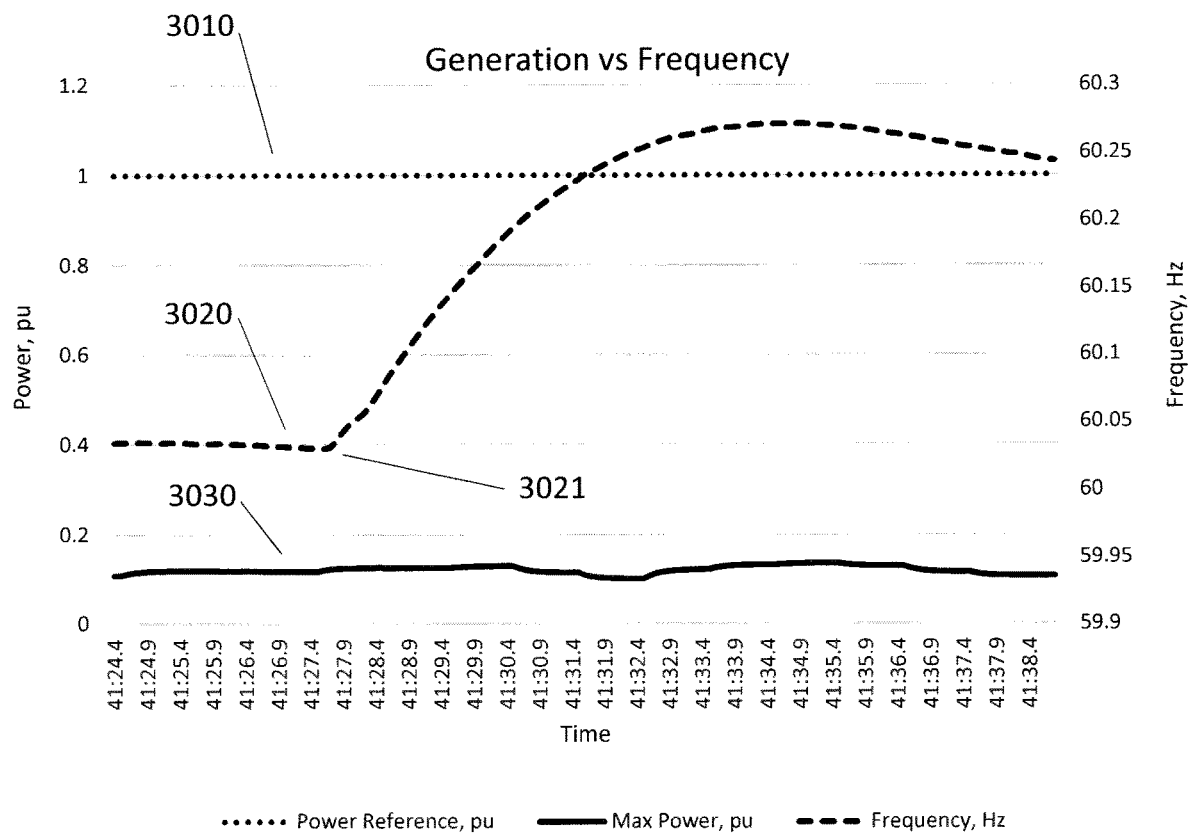
FIG. 2 is a chart illustrating operations of the control system of FIG. 1 in accordance with the prior art.
Figure 3:
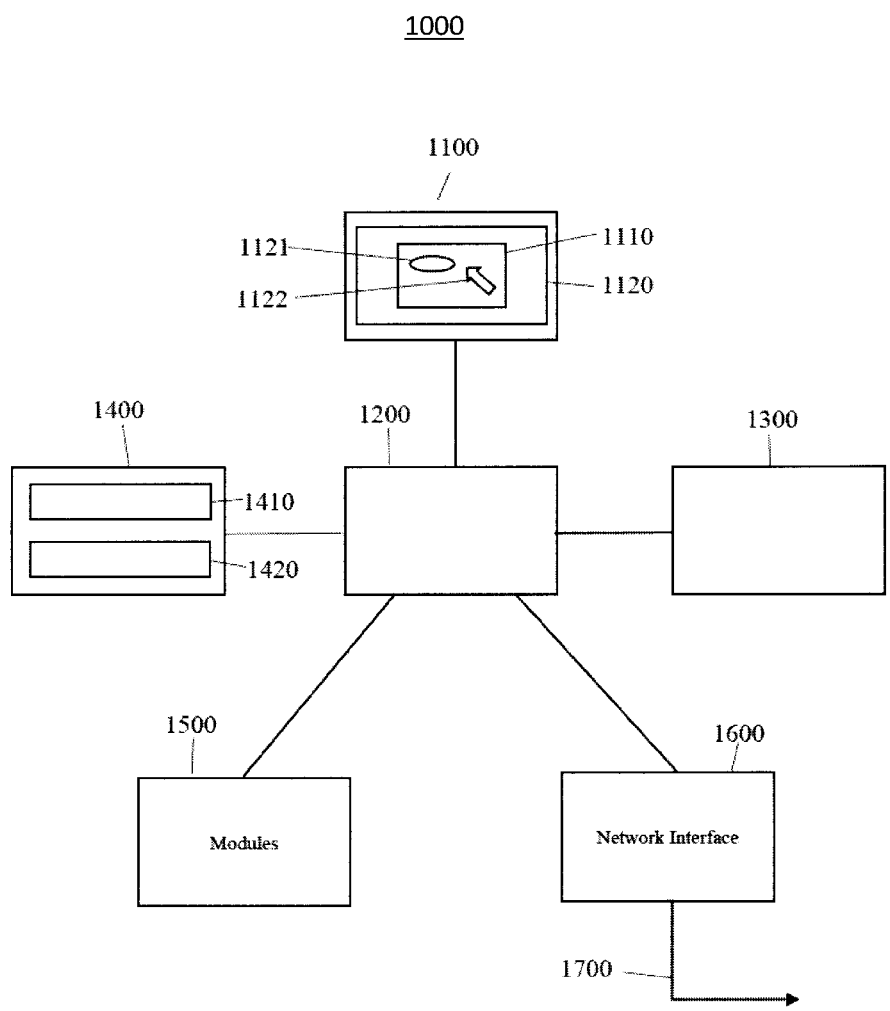
FIG. 3 is a block diagram illustrating an information system in accordance with an embodiment of the invention.

FIG. 3 is a block diagram illustrating an information system 1000 in accordance with an embodiment of the invention. The information system 1000 is suitable for performing as a control system (e.g., 2800), supervisory control and data acquisition ("SCADA") system, energy management system ("EMS"), or the like. The information system 1000 may be implemented as a virtual machine. The information system 1000 may be a client and/or a server in a client-server configuration. As an example, the information system 1000 may be a server and/or a personal computer. The information system 1000 may be a distributed system deployed on multiple processors or hosts.

The information system 1000 includes a display 1100, a processor or CPU 1200, an input device 1300, memory 1400, and an interface device 1600. The display 1100 may include a computer screen or a television screen. The CPU 1200 is coupled to a memory 1400 that stores an operating system 1420 to manage the information system 1000. The CPU 1200 is operatively coupled to an input device 1300 for receiving user commands and to the display 1100 for displaying the results of these commands to a user. These commands may also be received over a network 1700 via the interface device 1600. The CPU 1200 may operate in association with dedicated co-processors, memory devices, or other hardware modules 1500. The input device 1300 may include a keyboard, mouse, touchpad, or the like. The memory 1400 may include a plurality of storage devices including an internal memory and an external storage device. For example, memory 1400 may include databases, random access memory, read-only memory, flash drives, and/or hard disk devices. The information system 1000 may include a database management system and a database 1410 that may be stored in the memory 1400 of the information system 1000. The interface device 1600 may include one or more network connections. The information system 1000 may be adapted to communicate with other information systems over a network 1700 (e.g., control system 2800, master SCADA/EMS 2900) via the interface device 1600. For example, the interface device 1600 may include an interface to a network 1700 such as the Internet and/or a wireless network. Thus, the interface 1600 may include suitable transmitters, receivers, connectors, and the like. The information system 1000 may be associated with other information systems (e.g., 2800, 2900) over the network 1700. Of course, the information system 1000 may include additional software and hardware, the description of which is not necessary for understanding the invention.

The information system 1000 includes programmed computer-executable instructions to implement embodiments of the present invention. The instructions may be embodied in one or more hardware modules 1500 or program (software) modules (e.g., 1420) resident in the memory 1400 of the information system 1000. Alternatively, programmed instructions may be embodied on a machine-readable medium or product such as one or more DVDs, CDs, etc.

A user may interact with the information system 1000 using a user interface ("UI") 1120 such as a graphical user interface. The UI 1120 may be used for monitoring, managing, and accessing the information system 1000. Typically, a UI is used to display information to and receive commands from users and includes a variety of controls including icons, drop-down menus, toolbars, text, buttons, and the like. A user interacts with the UI 1120 presented on a display 1100 by using an input device 1300 to position a pointer or cursor 1122 over a graphical object, for example, an icon, menu, etc. 1121 and by selecting the object 1121. Typically, UI elements are presented in at least one window 1110, that is, a rectangular area within the display 1100. A window 1110 may be open, closed, displayed full screen, reduced in size, or moved to different areas of the display 1100.

Figure 4:
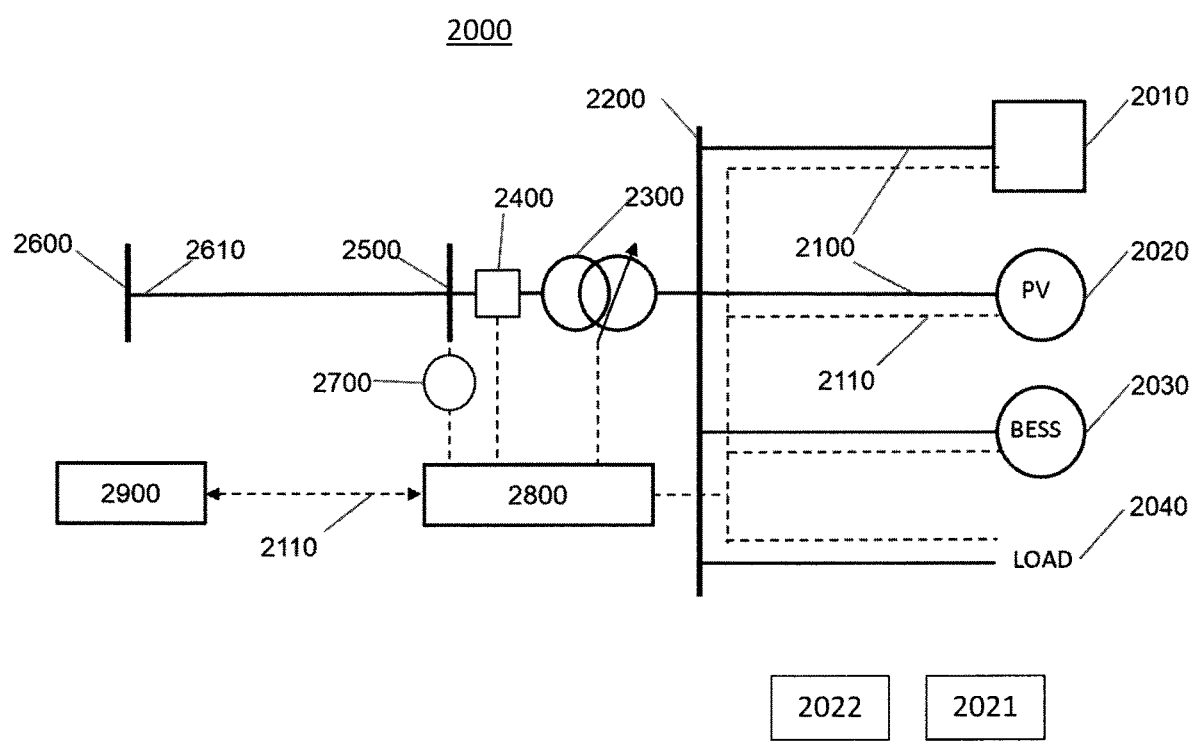
FIG. 4 is a block diagram illustrating a renewable energy plant in accordance with an embodiment of the invention.

FIG. 4 is a block diagram illustrating a renewable energy plant 2000 in accordance with an embodiment of the invention. The renewable energy plant 2000 may be a photovoltaic plant. The photovoltaic plant 2000 may include a photovoltaic system 2020 which includes photovoltaic arrays 2021, inverters 2022, and transformers. An electrical collector subsystem, which includes feeders 2100 and a medium voltage bus 2200, connects the PV system 2020 to a generator step-up transformer 2300. The generator step-up transformer 2300 may be equipped with an on-load tap changer. The control system 2800 (e.g., information system 1000) controls the properties of the PV system 2020 at a point of common coupling 2600. The control system 2800 receives setpoints from a master SCADA/EMS 2900 (e.g., information system 1000) over a communications network 2110 (e.g., network 1700). The control system 2800 receives measurements such as power flow and frequency from a power meter 2700 located at a point of metering 2500. The plant 2000 may also include: a battery energy storage system ("BESS") 2030, an electric load 2040, shunt capacitors and reactor banks 2010, or combinations of these. Finally, a circuit breaker 2400 connects the plant 2000 to the electrical grid 2610.

Figure 5:
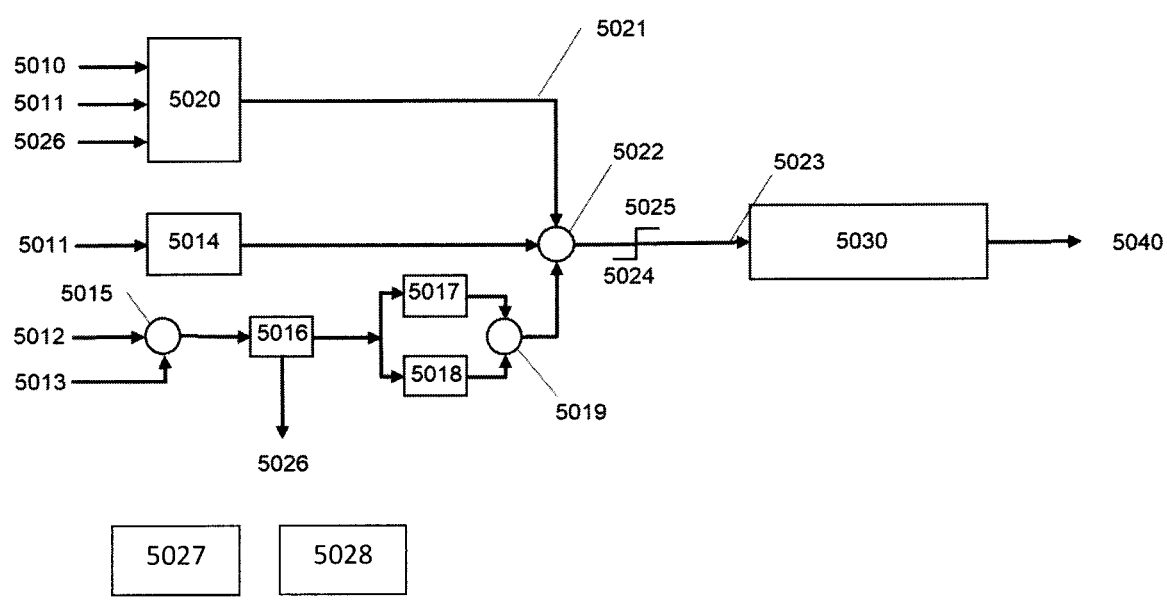
FIG. 5 is a block diagram illustrating a control system in accordance with an embodiment of the invention.

FIG. 5 is a block diagram illustrating a control system 2800 in accordance with an embodiment of the invention. And, FIG. 6 is a flow chart illustrating operations 5000 of the control system 2800 of FIG. 5 in accordance with an embodiment of the invention.

Figure 6:
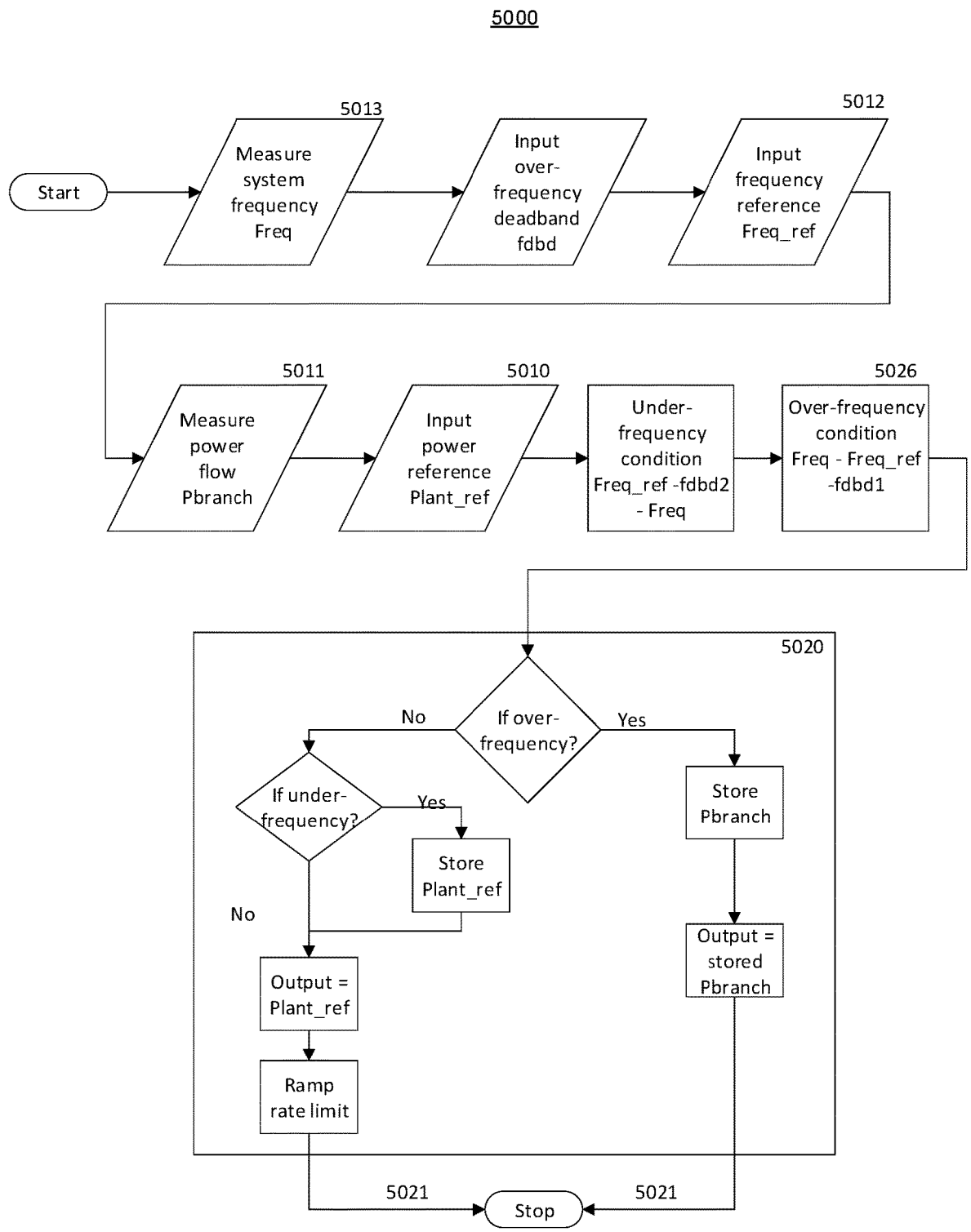
FIG. 6 is a flow chart illustrating operations of the control system of FIG. 5 in accordance with an embodiment of the invention; and, FIG. 7 is a flow chart illustrating operations of modules within an information system for providing frequency response for a renewable energy plant coupled to an electric power grid, the renewable energy plant having an intermittent energy source, in accordance with an embodiment of the invention.

Referring to FIGS. 5 and 6, a power reference 5010 is processed through a logic block 5020. Measured at the point of metering (e.g., 2500 in FIG. 4), power flow for plant regulation 5011 is processed through a filter 5014 and subtracted from the output 5021 of the logic block 5020 in a summation block 5022 to form or generate an error signal 5023. The frequency droop response applied 5022 to the power reference 5010 processed through the logic block 5020, acts during frequency events 5026. Frequency deviation (or frequency) 5012 is subtracted in block 5015 from a frequency deviation (or frequency) reference 5013. The droop is defined by an over- and under-frequency dead bandblock 5016. Down and up regulation droop is defined by blocks 5017 and 5018 and summation block 5019. The error signal 5023 is limited between minimum 5024 and maximum 5025 power error limits. The error signal 5023 is handled by a controller 5030 which may be a proportional-integral ("PI") controller or any other type of controller. The controller output 5040 is sent to the inverters 2022 to control the active power output of the inverters 2022 (i.e., of the photovoltaic system 2020).

Referring again to FIGS. 5 and 6, when system frequency 5012 deviates outside of the deadband (e.g., a predetermined frequency deviation deadband) 5016, updated reference values can be disregarded thereby preventing undesirable frequency response impact.

Referring again to FIGS. 5 and 6, when a cloud (for example) covers the PV arrays 2021 causing a decrease in power flow 5011 below the power reference 5010 and when system frequency increases above over-frequency deadband in block 5016, a signal 5026 is sent to the logic block 5020 causing the power flow value 5011 to be stored in the logic block 5020 and forming the block's output signal 5021 which in turn sustains frequency response until system frequency decreases below the over-frequency deadband. In this case, frequency droop response is applied to the power flow 5011 to decrease the power flow proportionally with respect to the frequency deviation outside of the deadband.

Referring again to FIGS. 5 and 6, when the system frequency returns to within the deadband, the logic block 5020 ramps output 5021 from the power flow current value 5011 to the power reference value 5010 providing a gradual power flow transition to the power reference level 5010.

According to one embodiment, as illustrated in the FIG. 5, frequency control may be embedded in an inverter (or inverters) 2022. In this case, frequency and power measurements may be performed at the terminals of the inverter(s) 2022.

Referring again to FIGS. 5 and 6, according to one embodiment, there is provided a method for providing renewable energy plant frequency response, the plant 2000 having an intermittent energy source 2020, the method comprising: using a control system 2800, maintaining power flow to and from a power grid 2610 coupled to the renewable energy plant 2000 by: measuring active power flow 5011 for plant regulation and subtracting 5022 its value from a power reference 5010 to form an error signal 5023; applying a frequency droop response to the power reference 5010 during frequency events; the frequency droop being characterized by a deadband 5016 and regulation droop 5017, 5018, 5019; handling the error signal 5023 by a controller 5030 to control the intermittent energy source 2020; when the power flow 5011 is below the power reference 5010 and the frequency increases above the deadband, the power flow value is stored 5020, and the frequency droop response 5017, 5018, 5019 is applied to the power flow stored value until frequency returns to within the deadband. In the above method, the updated power reference values may be disregarded while frequency deviates outside of the deadband. The power flow may be gradually transitioned from its current value 5011 to the power reference 5010 when the system frequency returns to within the deadband. The intermittent energy source 2020 may include a wind turbine. The intermittent energy source 2020 may be one or more intermittent energy sources. The renewable energy plant 2000 may have an energy load 2040 coupled thereto. And, the energy load 2040 may be one or more energy loads.

Also in the above method, the power flow may be gradually transitioned from its current value to the power reference 5010 when the system frequency returns to within the deadband. The power flow transition may be controlled by a ramp limiting block 5027 with a configurable ramp rate, or ramp-up and ramp-down rates. And, a configurable timer 5028 may be used to delay the power flow transition after the system frequency returns to within the deadband.

According to another embodiment, there is provided a method for providing renewable energy plant frequency response, the plant 2000 having an intermittent energy source 2020, the method comprising: using a control system 2800, maintaining power flow to and from a power grid 2610 coupled to the renewable energy plant 2000 by: measuring active power flow 5011 for plant regulation and subtracting 5022 its value from a power reference 5010 to form an error signal 5023; applying a frequency droop response 5017, 5018, 5019 to the power reference 5010 during frequency events; handling the error signal 5023 with a controller 5030; communicating the controller's output 5040 to control the intermittent energy source 5040; and, when the power flow is below the power reference 5010 and the frequency increases above the over-frequency deadband, the frequency droop response is applied to the power flow. In the above method, after the system frequency returns to within the deadband, the power flow is gradually transitioned from its current value to the power reference 5010.

The embodiments described herein may contribute to an improved method and system for renewable energy plant frequency response and may provide one or more advantages. First, the system 2800 ensures automatic sustained frequency response that begins immediately after the power system frequency deviates outside of the deadband until the frequency returns to a value within the deadband. Second, the system 2800 provides an unabrupt transition after the power system frequency returns to a value within the deadband, smoothly ramping power generation to the value set by the power reference. Third, the system 2800 provides frequency response for generating assets under automatic generation control ("AGC") that is compliant with grid interconnection requirements. For reference, AGC is an advanced power system application typically controlling power plants in an ISO/RTO/utility service area. AGC reacts upon power system frequency deviations by adjusting a plant's power reference in a direction opposite to the frequency droop direction. This is done so that the AGC doesn't override the plant frequency response. However, AGC operates asynchronously with respect to power plant control. In addition, AGC has a significantly longer cycle time (typically 1 to 5 seconds) compared to the power plant control cycle time (typically below 1 second). Furthermore, AGC may have a significant delay in data communications and a significant execution time. Consequently, AGC acting on "old" power and frequency data may override the plant frequency response. To prevent this from happening, the system 2800 of the present invention disregards AGC updated commands while responding to a frequency event.

Aspects of the methods and systems described herein may be illustrated with the aid of a flowchart.

FIG. 7 is a flow chart illustrating operations 700 of modules (e.g., 1420, 1500) within an information system (e.g., 1000, 2800) for providing frequency response for a renewable energy plant 2000 coupled to an electric power grid 2610, the renewable energy plant 2000 having an intermittent energy source (e.g., 2020), in accordance with an embodiment of the invention.

At step 701, the operations 700 start.

At step 702, using a renewable energy plant control system (e.g., 2800), frequency (or frequency deviation) of the power output from the renewable energy plant 2000 is measured and a first difference signal between the measured frequency (or measured frequency deviation) 5012 and a frequency reference (or frequency deviation reference) 5013 is determined 5015.

At step 703, power output from the renewable energy plant 2000 is measured and the measured power output 5011 is stored as a stored measured power output value (e.g., in a logic block 5020 in the memory 1400 of the control system 2800).

At step 704, while the first difference signal is within a predetermined frequency deviation deadband 5016, a second difference signal is determined 5022 as a difference between a power reference 5010 and the measured power output 5011.

At step 705, while the first difference signal indicates an over-frequency condition 5026, the second difference signal is determined 5022 as a difference between the stored measured power output value and the measured power output 5011.

At step 706, while the first difference signal indicates an under-frequency condition 5026, the second difference signal is set equal to the power reference 5010.

At step 707, an error signal 5023 is generated by limiting a sum 5022 of the first and second difference signals between predetermined minimum and maximum power error limits 5024, 5025.

At step 708, a control signal 5040 is generated by applying the error signal 5023 to a controller (or loop) 5030.

At step 709, the control signal 5040 is applied to the intermittent energy source 2020 to control the power output therefrom.

At step 710, the operations 700 end.

In the above method, the power reference 5010 may be disregarded while the first difference signal is outside of the predetermined frequency deviation deadband 5016. The control signal 5040 may control the power output to gradually transition to the power reference when the first difference signal is within or returns to within the predetermined frequency deviation deadband 5016. The transition may be controlled by a configurable timer 2028 which delays the transition. The power reference 5010 may have associated therewith at least one of a ramp-up rate limit value and a ramp-down rate limit value (e.g., stored in a ramp limiting block 5027). At least one of the ramp-up rate limit value and the ramp-down rate limit value may be user configurable. The frequency (or frequency deviation) and power output may be measured at the intermittent energy source 2020. The power output from the renewable energy plant 2000 may be an active power output, the power reference 5010 may be an active power reference, the minimum and maximum power error limits 5024, 5025 may be minimum and maximum active power error limits, and the power output from the intermittent energy source 2020 may be an active power output. The intermittent energy source may include a photovoltaic energy source 2020. The intermittent energy source may include a wind turbine. The intermittent energy source 2020 may be one or more intermittent energy sources. The renewable energy plant 2000 may have at least one energy load 2040 coupled thereto. The renewable energy plant 2000 may have at least one controllable load 2040 coupled thereto. The renewable energy plant 2000 may have at least one energy storage 2030 coupled thereto. The controller 5030 may be a proportional-integral ("PI") controller or loop. And, the control signal 5040 may be applied to the intermittent energy source 2020 to control the power output therefrom and to maintain power flow to and from the electric power grid 2610 coupled to the renewable energy plant 2000.

According to one embodiment, each of the above steps 701-710 may be implemented by a respective software module 1420. According to another embodiment, each of the above steps 701-710 may be implemented by a respective hardware module 1500 (e.g., application-specific hardware 1500). According to another embodiment, each of the above steps 701-710 may be implemented by a combination of software 1420 and hardware modules 1500. For example, FIG. 7 may represent a block diagram illustrating the interconnection of specific hardware modules 701-710 (collectively 1500) within the information system or systems 1000, each hardware module 701-710 adapted or configured to implement a respective step of the method of the application.

According to one embodiment, one or more of the software 1420 and hardware modules 1500 (or to components referred to as a "module" herein) may be implemented by one or more information systems 1000 or components thereof.

According to one embodiment, certain implementations of the functionality of the present application are sufficiently mathematically, computationally, or technically complex that application-specific hardware (e.g., 1500) or one or more physical computing devices (e.g., 1000, 1200, 2800) (using appropriate executable instructions (e.g., 1420)) may be necessary or essential to perform that functionality, for example, due to the volume or complexity of the calculations involved and/or to provide results substantially in real-time.

While this application is primarily discussed as a method, a person of ordinary skill in the art will understand that the apparatus discussed above with reference to an information system 1000 may be programmed to enable the practice of the method of the invention. Moreover, an article of manufacture for use with an information system 1000, such as a pre-recorded storage device or other similar computer readable medium or computer program product including program instructions recorded thereon, may direct the information system 1000 to facilitate the practice of the method of the invention. It is understood that such apparatus, products, and articles of manufacture also come within the scope of the invention.

In particular, the sequences of instructions which when executed cause the method described herein to be performed by the information system 1000 may be contained in a data carrier product according to one embodiment of the invention. This data carrier product may be loaded into and run by the information system 1000. In addition, the sequences of instructions which when executed cause the method described herein to be performed by the information system 1000 may be contained in a computer software product or computer program product (e.g., comprising a non-transitory medium) according to one embodiment of the invention. This computer software product or computer program product may be loaded into and run by the information system 1000. Moreover, the sequences of instructions which when executed cause the method described herein to be performed by the information system 1000 may be contained in an integrated circuit product (e.g., a hardware module or modules 1420, 1500) which may include a coprocessor or memory according to one embodiment of the invention. This integrated circuit product may be installed in the information system 1000.

The embodiments of the application described above are intended to be examples only. Those skilled in the art will understand that various modifications of detail may be made to these embodiments, all of which come within the scope of the invention.

What is claimed is:

1. A method for providing frequency response for a renewable energy plant coupled to an electric power grid, the renewable energy plant having an intermittent energy source, the method comprising:

using a renewable energy plant control system, measuring frequency of the power output from the renewable energy plant and determining a first difference signal between the measured frequency and a frequency reference;

measuring power output from the renewable energy plant and storing the measured power output as a stored measured power output value;

while the first difference signal is within a predetermined frequency deviation deadband, determining a second difference signal as a difference between a power reference and the measured power output;

while the first difference signal indicates an over-frequency condition, determining the second difference signal as a difference between the stored measured power output value and the measured power output;

while the first difference signal indicates an under-frequency condition, setting the second difference signal equal to the power reference;

generating an error signal by limiting a sum of the first and second difference signals between predetermined minimum and maximum power error limits;

generating a control signal by applying the error signal to a controller; and, applying the control signal to the intermittent energy source to control the power output therefrom.

2. The method of claim 1, wherein the power reference is disregarded while the first difference signal is outside of the predetermined frequency deviation deadband.

3. The method of claim 1, wherein the control signal controls the power output to gradually transition to the power reference when the first difference signal is within or returns to within the predetermined frequency deviation deadband.

4. The method of claim 3, wherein the transition is controlled by a configurable timer which delays the transition.

5. The method of claim 3, wherein the power reference has associated therewith at least one of a ramp-up rate limit value and a ramp-down rate limit value.

6. The method of claim 5, wherein at least one of the ramp-up rate limit value and the ramp-down rate limit value is user configurable.

7. The method of claim 1, wherein the frequency deviation and power output are measured at the intermittent energy source.

8. The method of claim 1, wherein the power output from the renewable energy plant is an active power output, wherein the power reference is an active power reference, wherein the minimum and maximum power error limits are minimum and maximum active power error limits, and wherein the power output from the intermittent energy source is an active power output.

9. The method of claim 1, wherein the intermittent energy source includes a photovoltaic energy source.

10. The method of claim 1, wherein the intermittent energy source includes a wind turbine.

11. The method of claim 1, wherein the intermittent energy source is one or more intermittent energy sources.

12. The method of claim 1, wherein the renewable energy plant has at least one energy load coupled thereto.

13. The method of claim 1, wherein the renewable energy plant has at least one controllable load coupled thereto.

14. The method of claim 1, wherein the renewable energy plant has at least one energy storage coupled thereto.

15. The method of claim 1, wherein the controller is a proportional-integral ("PI") controller or loop.

16. The method of claim 1, wherein the control signal is applied to the intermittent energy source to control the power output therefrom and to maintain power flow to and from the electric power grid coupled to the renewable energy plant.

17. A control system for providing frequency response for a renewable energy plant coupled to an electric power grid, the renewable energy plant having an intermittent energy source, the control system comprising:
 a processor coupled to memory; and,
 at least one of hardware and software modules within the memory and controlled or executed by the processor, the modules including computer readable instructions executable by the processor for causing the control system to implement the method of claim 1.

* * * * *